United States Patent
Munn et al.

(10) Patent No.: US 7,303,230 B2
(45) Date of Patent: Dec. 4, 2007

(54) JUVENILE VEHICLE SEAT WITH QUICK-CONNECT BACKREST

(75) Inventors: Ronald F. Munn, Hope, IN (US); William Horton, Hope, IN (US); Philip W. Burbrink, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 211 days.

(21) Appl. No.: 11/149,748

(22) Filed: Jun. 10, 2005

(65) Prior Publication Data

US 2006/0279116 A1    Dec. 14, 2006

(51) Int. Cl.
*A47C 1/08* (2006.01)

(52) U.S. Cl. ............ 297/255; 297/440.16; 297/440.15; 297/440.2; 297/256.16; 297/440.13; 297/440.14

(58) Field of Classification Search .......... 297/440.16, 297/440.15, 440.21, 440.2, 250.1, 440.13, 297/440.14, 255, 256, 256.16
See application file for complete search history.

(56) References Cited

U.S. PATENT DOCUMENTS

| | | | |
|---|---|---|---|
| 4,919,485 A * | 4/1990 | Guichon | 297/440.23 |
| 5,938,285 A | 8/1999 | Verbeek | |
| 6,378,950 B1 | 4/2002 | Takamizu et al. | |
| 6,464,294 B1 | 10/2002 | Kain | |
| 6,488,339 B1 | 12/2002 | Finner et al. | |
| 6,491,348 B1 * | 12/2002 | Kain | 297/484 |
| 6,623,074 B2 | 9/2003 | Asbach et al. | |
| 7,021,710 B2 * | 4/2006 | Kain et al. | 297/256.11 |
| 7,055,903 B2 * | 6/2006 | Balensiefer et al. | 297/256.11 |
| 2003/0151282 A1 | 8/2003 | Williams et al. | |
| 2004/0070244 A1 | 4/2004 | Williams et al. | |
| 2004/0124678 A1 | 7/2004 | Williams et al. | |
| 2006/0138848 A1 * | 6/2006 | Balensiefer et al. | 297/440.16 |

* cited by examiner

*Primary Examiner*—David Dunn
*Assistant Examiner*—Erika Garrett
(74) *Attorney, Agent, or Firm*—Barnes & Thornburg LLP (57) ABSTRACT

A juvenile vehicle seat includes a seat base and a backrest. The backrest is mounted on the seat base and includes a seat back that is retained in an upright fixed seat-forming position relative to a seat bottom included in the seat base.

40 Claims, 8 Drawing Sheets

JUVENILE VEHICLE SEAT WITH QUICK-CONNECT BACKREST

BACKGROUND

The present disclosure relates to juvenile vehicle seats, and, in particular, to backrests for juvenile vehicle seats. More particularly, the present disclosure relates to a backrest mounted on a seat base to provide a juvenile vehicle seat.

SUMMARY

A juvenile vehicle seat in accordance with the present disclosure includes a seat base formed to include a seat bottom and several upwardly opening sockets located in a rearward portion of the seat bottom. The juvenile vehicle seat further includes a backrest including at least one post extending downwardly into a post-receiving channel formed in a companion socket. Each post is anchored to its companion socket to orient a seat back included in the backrest in an upright fixed seat-forming position relative to the seat bottom included in the seat base.

In illustrative embodiments, the juvenile vehicle seat also includes a headrest that can be mounted for controlled up-and-down movement on the seat back. The seat base, headrest, and seat back are adapted to be stacked in series in a nested configuration in a compact shipping carton. Those separate components can be assembled easily by a customer once the components have been removed from the shipping carton and separated. After the backrest is moved to engage the seat base and rotated about an axis to assume a mated position, the backrest is lowered toward the seat bottom to extend the posts into the companion sockets to establish the anchored position, and the headrest is coupled to the anchored backrest.

In illustrative embodiments, first, second, and third sockets are formed in a rearward portion of the seat bottom underlying the backrest and located in spaced-apart relation to one another. The seat base also includes a first armrest located near to the first socket and a second armrest located near the second socket and arranged to lie in spaced-apart relation to the first armrest to locate the seat bottom therebetween. The third socket is a "center" socket located midway between the first and second "side" sockets.

First, second, and third posts are coupled to the seat back and arranged to extend downwardly into post-receiving channels formed in the first, second, and third sockets. When the backrest is mounted rigidly on the seat base by anchoring the posts in companion sockets, the seat back of the backrest and the seat bottom of the seat base cooperate to define a juvenile seating surface on the juvenile vehicle seat.

In illustrative embodiments, the backrest further includes a pair of keepers arranged to extend outwardly from the seat back in opposite directions and extend into companion pass-through slots formed in the seat base. During assembly, the backrest is held in a horizontal position above the seat bottom and the keepers are inserted into their companion pass-through slots formed in the seat base. The backrest is then pivoted rearwardly about 90° about a pivot axis and then moved downwardly toward the seat base so that the keepers move downwardly in their companion pass-through slots until the three posts on the seat back are anchored in the post-receiving sockets formed in the seat base.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

A juvenile vehicle seat 10 includes a backrest 12, a seat base 14 carrying armrests 51 and 52, and a headrest 16 as shown, for example, in FIGS. 1-4. This seat 10 can be shipped in an unassembled state in a relatively small and compact carton 18 as suggested in FIG. 1. A purchaser can remove the disassembled and packed seat shown in FIG. 3 from shipping carton 18 and separate the components 12, 14, 16 in the manner shown, for example, in FIG. 4. The components 12, 14, 16 can then be assembled by the purchaser in the manner shown, for example, in FIGS. 5-7 to produce an assembled juvenile vehicle seat 10 as shown, for example, in FIG. 2.

Figure 1:
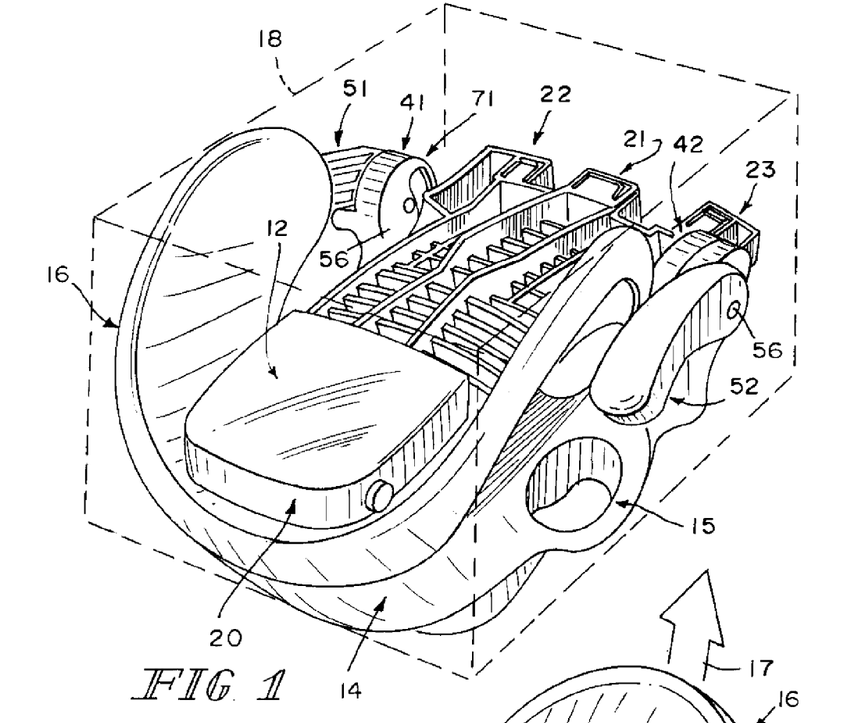
FIG. 1 is a perspective view of a disassembled juvenile vehicle seat packed to be stored in a shipping carton (in phantom), the juvenile vehicle seat including a seat base formed to include cup holders and armrest mounts carrying pivotable cantilevered armrests, a headrest placed on a seat bottom included in the seat base and located between the armrests, and a backrest arranged loosely to overlie the seat bottom to "sandwich" the headrest between the seat bottom and the backrest.
Figure 2:
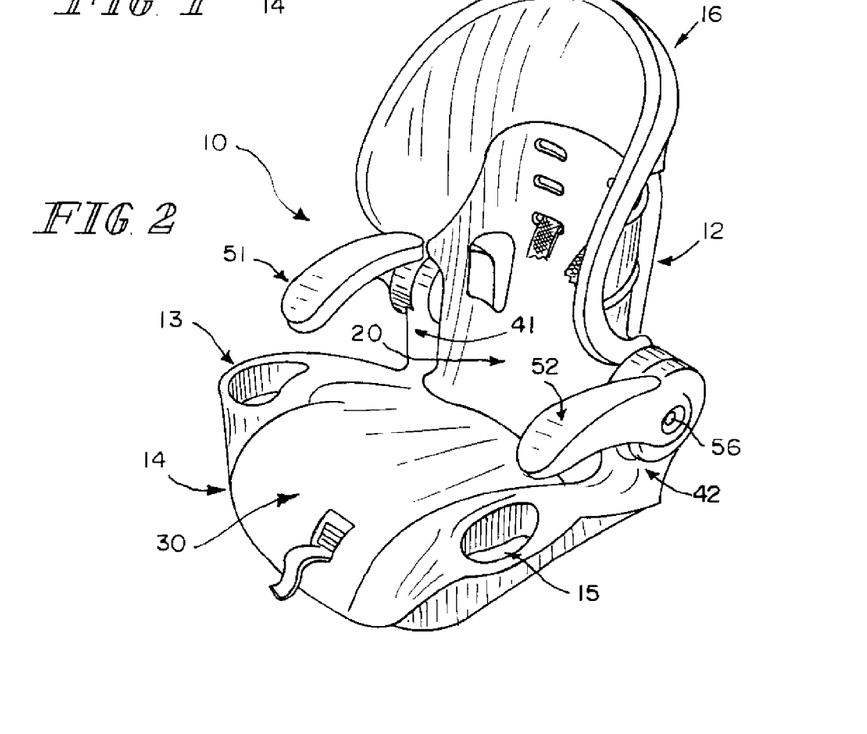
FIG. 2 is a perspective view of a juvenile seat in accordance with the present disclosure assembled using the three separate components shown in FIG. 1 and showing the backrest coupled to the seat base to lie in an upright position relative to the seat bottom in the manner shown, for example, in FIGS. 5-7 and showing the headrest coupled to an upper portion of the backrest.
Figure 3:
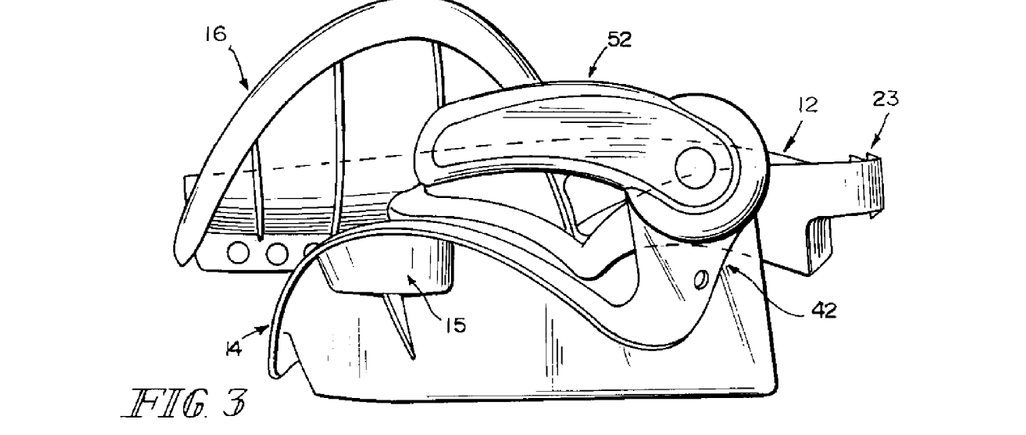
FIG. 3 is a side elevation view of the disassembled and packed juvenile vehicle seat of FIG. 1.
Figure 4:
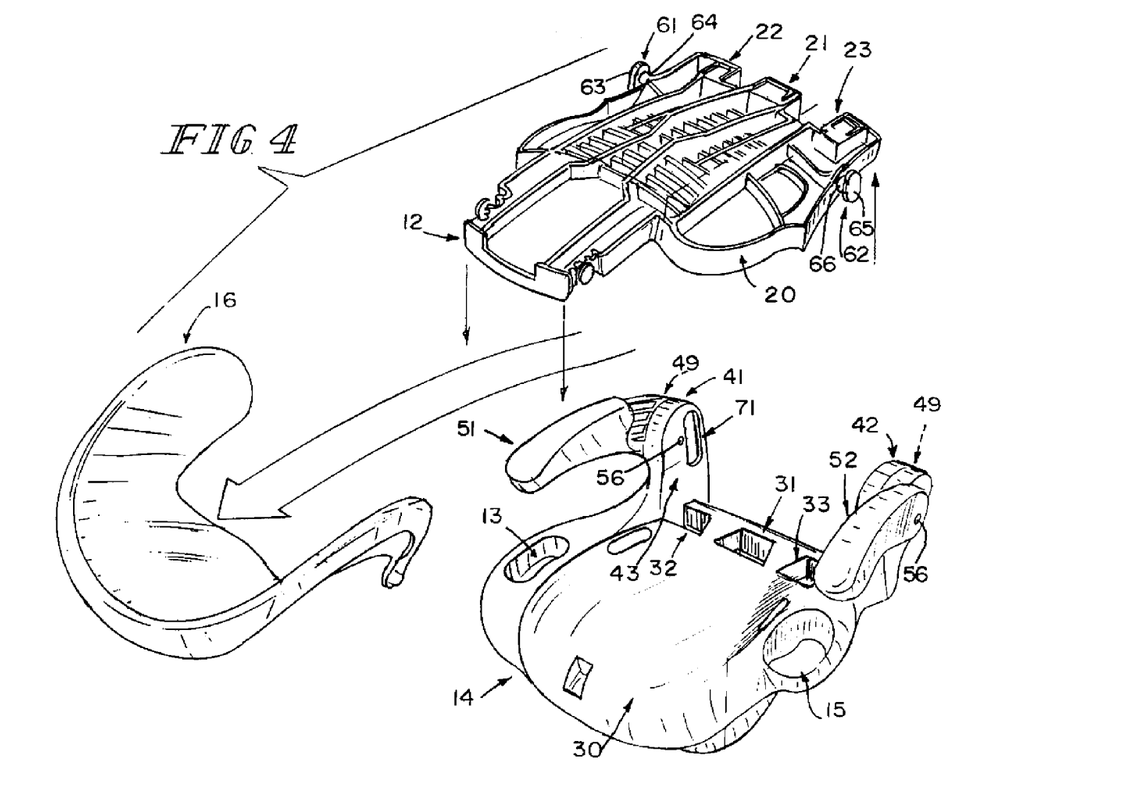
FIG. 4 is a perspective view similar to FIG. 1 showing removal of the headrest from its packed and stored position between the seat base and the backrest preparatory to assembly of the illustrated components to produce the juvenile seat shown in FIG. 2.

As shown best in FIGS. 1 and 4, backrest 12 includes a seat back 20 and first, second, and third posts 21, 22, 23 coupled to seat back 20. Seat base 14 includes seat bottom 30 and first, second, and third sockets 31, 32, 33 and carries first and second armrests 51, 52. Posts 21, 22, 23 mate with sockets 31, 32, 33 as suggested in FIGS. 5-7 to orient backrest 12 in an upright seat-forming position as shown, for example, in FIG. 2. Headrest 16 is mounted for movement on backrest 12 in direction 17 to adjust the height of headrest 16 relative to backrest 12.

Figure 5:
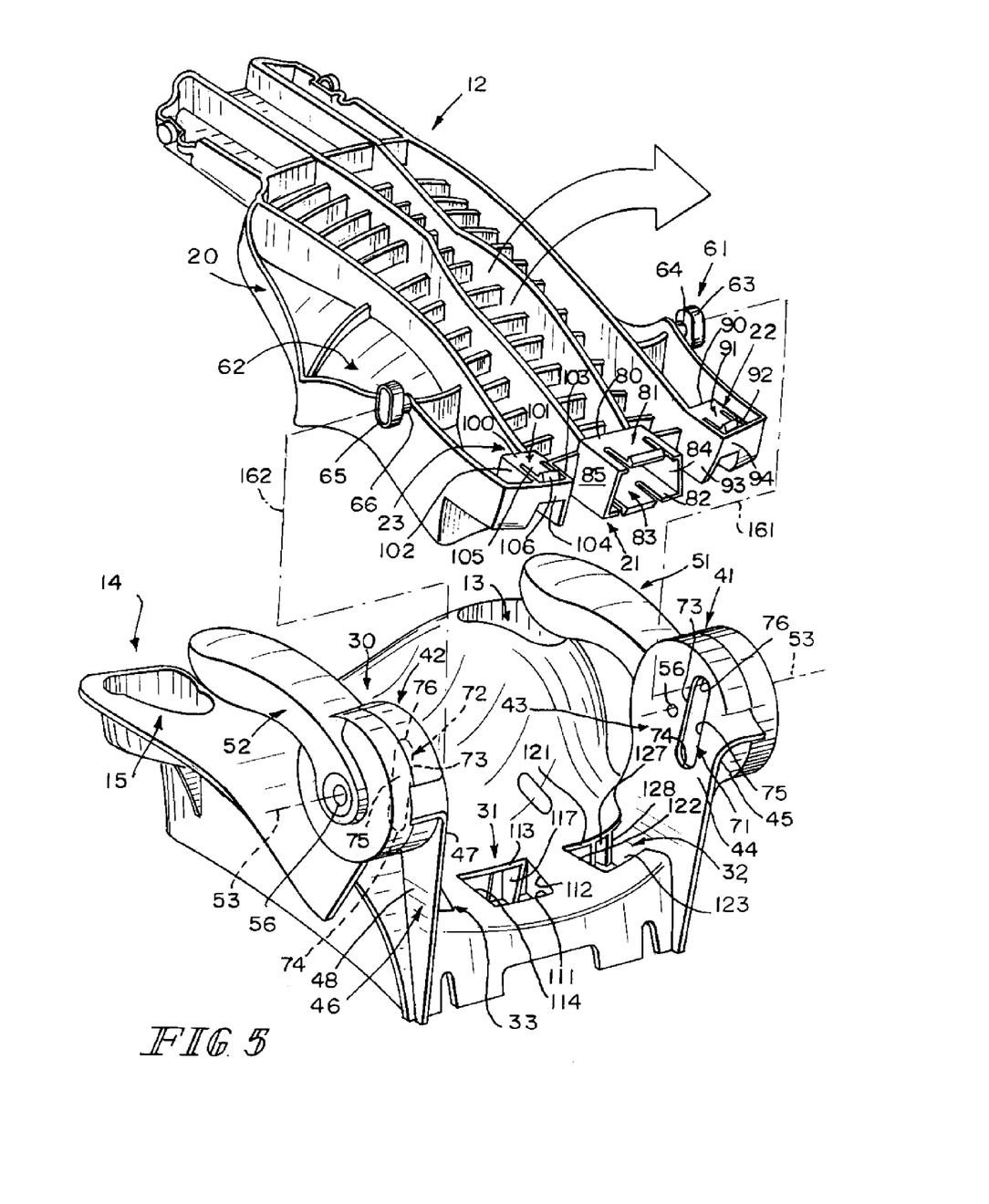
FIG. 5 is an enlarged perspective view of the seat base and the backrest suggesting movement of the backrest relative to the seat base to cause oblong first and second back retainers coupled to companion retainer support rods projecting outwardly in opposite directions from a seat back included in the backrest to assume a "vertical" orientation arranged to be passed through elongated oblong retainer pass-through slots formed in the first and second armrest mounts included in the seat base during an initial stage of mounting the backrest on the seat base.

As shown best in FIGS. 4 and 5, seat base 14 further includes a first backrest support 41 arranged to extend upwardly from seat bottom 30 and a second backrest support 42 also arranged to extend upwardly from seat bottom 30. First and second backrest supports 41, 42 are arranged to lie in spaced-apart relation to one another along a rear portion of seat bottom 30 to locate backrest 12 therebetween as shown, for example, in FIG. 2 after components 12, 14, 16 have been assembled to produce juvenile vehicle seat 10.

Seat base 14 is also formed to include a first cup holder 13 and a second cup holder 15 arranged to lie in spaced-apart relation to first cup holder 13 to locate seat bottom 30 therebetween. First cup holder 13 is arranged to lie forward of first backrest support 41. Second cup holder 15 is arranged to lie forward of second backrest support 42. In the illustrated embodiment, seat base 14 is a monolithic element made of a suitable plastics material.

Juvenile vehicle seat 10 includes a first armrest 51 coupled to first backrest support 41 and a second armrest 52 coupled to second backrest support 42. These armrests 51, 52 are arranged to extend normally in a forward direction relative to and away from seat back 20 of backrest 12 as suggested in FIGS. 1 and 2. In the illustrated embodiment, first and second armrests 51, 52 are mounted on seat base 14 (e.g., first and second backrest supports 41, 42) for pivotable movement about a pivot axis 53 shown, for example, in FIG. 5.

When disassembled, backrest 12, seat base 14, headrest 16, and armrests 51, 52 are packed in a manner shown, for example, in FIG. 1 in shipping carton 18. Headrest 16 is placed on seat bottom 30 of seat base 14 and located between armrests 51, 52 carried on seat base 14. Backrest 12 is arranged loosely to overlie seat bottom 30 and to "sandwich" headrest 16 between seat bottom 30 and backrest 12. Removal of headrest 16 from its packed and stored position between seat base 14 and backrest 12 is shown, for example, in FIG. 4.

Figure 6:
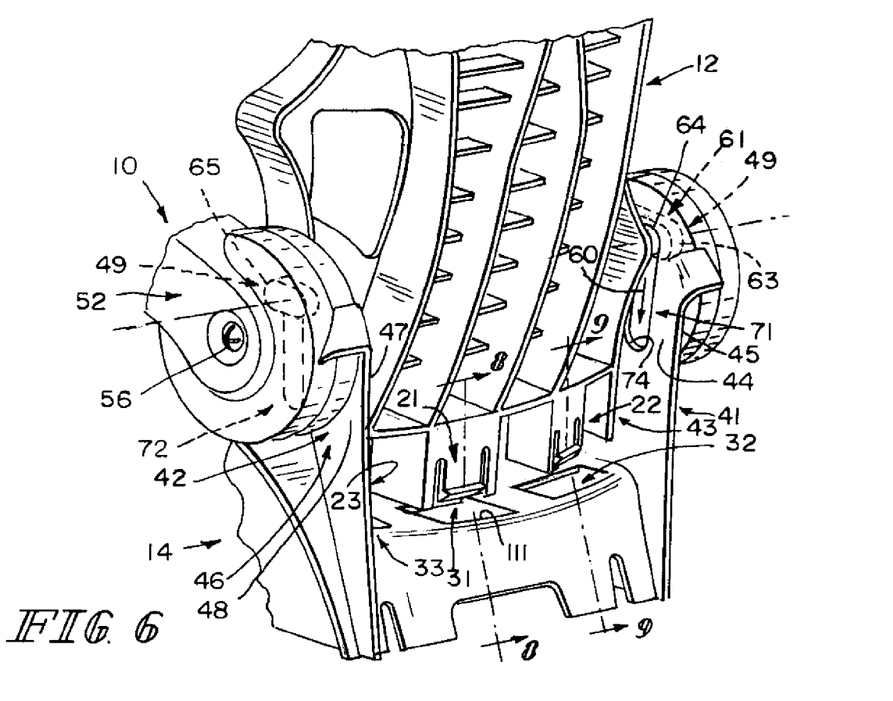
FIG. 6 is a perspective of a portion of the seat base and backrest of FIG. 5 showing a second backrest-mounting stage wherein the backrest is arranged to locate the retainer support rods in the retainer pass-through slots and rotated 90° about a pivot axis extending through the armrest mounts from the position shown in FIG. 5 to move the oblong first and second back retainers to assume a "horizontal" orientation to cause the back retainers to engage interior side walls of the armrest mounts to block removal of the back retainers from the armrest mounts without restricting vertical up-and-down movement of the retainer support rods in the retainer pass-through slots during later stages of movement of the backrest relative to the seat base toward an anchored position on the seat base.

As shown best in FIG. 5, backrest 12 includes a first keeper 61 coupled to seat back 20 and configured to extend through a first-retainer pass-through slot 71 formed in first backrest support 41 when backrest 12 is mounted on seat base 14. In the illustrated embodiment, backrest 12 also includes a second keeper 62 coupled to seat back 20 and configured to extend through a second-retainer pass-through slot 72 formed in second backrest support 42 when backrest 12 is mounted on seat base 14. One illustrative manner of inserting first keeper 61 into companion pass-through slot 71 and second keeper 62 into companion pass-through slot 72 and then moving backrest 12 relative to seat base 14 to block removal of backrest 12 from seat base 14 is represented by dashed lines 161 and 162 as shown in FIGS. 5 and 6. Downward movement of backrest 12 toward seat bottom 30 in direction 60 to anchor posts 21, 22, 23 in companion sockets 31, 32, 33 to complete assembly of juvenile vehicle seat 10 is suggested in FIGS. 6 and 7.

As shown best in FIG. 5, first keeper 61 includes a first back retainer 63 associated with first-retainer pass-through slot 71 and a first retainer support rod 64 configured to interconnect seat back 20 and first back retainer 62. Likewise, second keeper 62 includes a second back retainer 65 associated with second-retainer pass-through slot 72 and a second retainer support rod 66 configured to interconnect seat back 20 and second back retainer 65. As suggested in FIGS. 5-7, first and second retainer support rods 64, 66 support first and second back retainers 63, 65 in spaced-apart relation to seat back 20 so that seat back 20 can be rotated and moved relative to first and second armrest supports 41, 42 to couple first and second keeper 61, 62 and the three posts 21, 22, 23 to seat base 14.

As shown, for example, in FIGS. 5 and 6, first and second back retainers 63, 65 are positioned for movement relative to seat base 14 between an "unmated" position establishing a horizontal orientation as shown in FIG. 5 and a "mated" position establishing a vertical orientation as shown in FIG. 6. In the unmated position, first back retainer 63 is oriented to pass through first-retainer pass-through slot 71 freely to allow (1) movement of first keeper 61 into first-retainer pass-through slot 71 during installation of backrest 12 on seat base 14 and (2) removal of first keeper 61 from first-retainer pass-through slot 71 so as to permit later separation of backrest 12 from seat base 14. In the mated position, first back retainer 63 is arranged to mate with a portion of seat base 14 (e.g., a part of first backrest support 41) as suggested in FIG. 6 to block removal of first keeper 61 from first-retainer pass-through slot 71. Similarly, in the mated position, second back retainer 65 is arranged to mate with another portion of seat base 14 (e.g., a part of second backrest support 42) as suggested in FIG. 6 to block removal of second keeper 62 from second-retainer pass-through slot 72.

As shown in FIG. 5, first backrest support 41 includes an upright side wall 43 formed to include first-retainer pass-through slot 71. Upright side wall 43 includes a first surface 44 arranged to face toward second backrest support 42 and an opposite second surface 45 arranged to face away from second backrest support 42. Second surface 45 is configured to define said portion of seat base 14 that is mated with first back retainer 63 upon movement of first keeper 61 to the mated position. Likewise, second backrest support 42 includes an upright side wall 46 formed to include second-retainer pass-through slot 72. Upright side wall 46 includes a first surface 47 arranged to face toward first backrest support 41 and an opposite second surface 48 arranged to face away from first backrest support 41. Second surface 48 is configured to define said another portion of the seat base that is mated with second back retainer 65 upon movement of second keeper 62 to the mated position.

First armrest 51 is coupled to first backrest support 41 to form a chamber 49 therebetween containing first back retainer 63 as suggested in FIG. 6. First armrest 51 includes an arm support 54 mounted on first backrest support 41 for rotation about pivot axis 53 and an arm 55 cantilevered to arm support 54 to rotate therewith. An axle 56 is coupled to upright side wall 43 of first backrest support 41 and to arm support 54 and arranged to extend along axis 53 to support first armrest 51 for pivotable movement about pivot axis 53. In the illustrated embodiment, arm support 54 cooperates to form chamber 49. Second armrest 52 is formed and arranged in a manner similar to first armrest 51.

Figure 7:
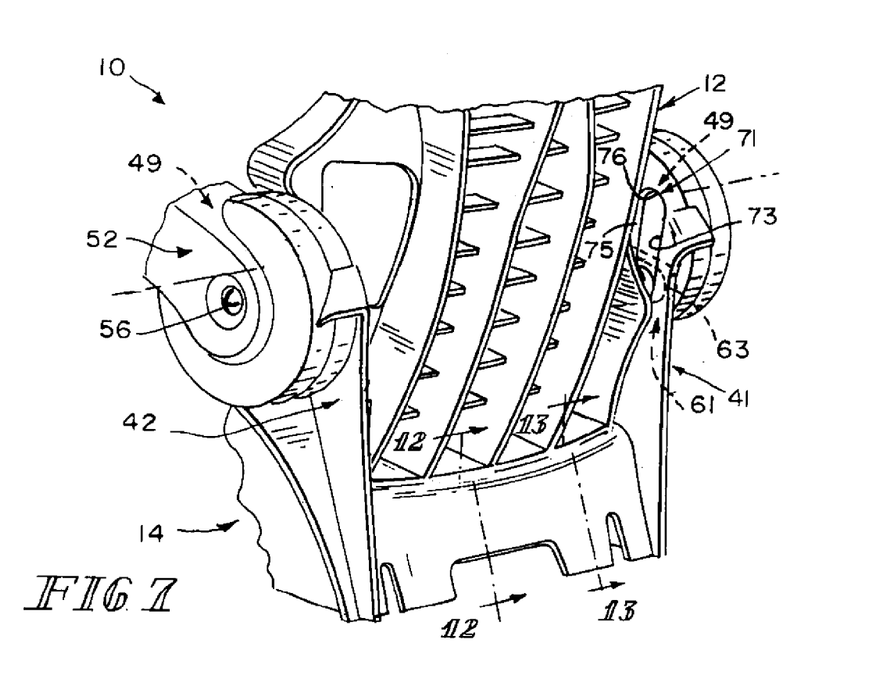
FIG. 7 is a view similar to FIG. 6 showing further downward movement of the backrest relative to the seat base to assume the anchored position on the seat base during a third backrest-mounting stage and showing movement of one of the retainer support rods to assume a lowest position in a companion retainer pass-through slot formed in one of the armrest mounts.

Once first and second back retainers 63, 65 have been moved to their mated positions as shown, for example, in FIG. 6, then seat back 20 can be moved downwardly in direction 60 as suggested in FIGS. 6 and 7. This downward movement causes first and second retainer support rods 64, 66 to move downwardly in companion pass-through slots 71, 72 and also causes first and second back retainers 63, 65 to move downwardly in the retainer chambers 49 until the posts 21, 22, 23 along the bottom edge of seat back 20 are anchored in place in the companion sockets 31, 32, 33 formed in seat base 14 as shown in FIG. 7.

As shown best in FIG. 5, upright side wall 43 includes an interior edge defining first-retainer pass-through slot 71. That interior edge has, in series, a first straight segment 73, a lower semicircular segment 74 coupled to first straight segment 73, a second straight segment 75 coupled to lower semicircular segment 74 and arranged to lie in spaced-apart relation to first straight segment 73 to define therebetween a width of first-retainer pass-through slot 71, and an upper semicircular segment 76 arranged to interconnect the first and second straight segments 73, 75. Upright side wall 46 of second backrest support 42 includes a similar interior edge having segments 73, 74, 75, 76 arranged to define second-retainer pass-through slot 72.

First back retainer 63 has an oblong shape in the illustrated embodiment as shown, for example, in FIGS. 4-7. First back retainer 63 has a length that is greater than the width of first-retainer pass-through slot 71 to block free movement of first back retainer 63 through slot 71 upon movement of seat back 20 relative to seat base 14 to locate first keeper 61 in the mated position as shown, for example in FIGS. 6 and 7. First back retainer 63 has a width that is less than the width of first-retainer pass-through slot 71 to allow free movement of first back retainer 63 through slot 71 upon movement of seat back 20 relative to seat base 14 to locate first keeper 61 in the unmated position. Second back retainer 62 is configured to interact with second-retainer pass-through slot 72 in a similar manner.

First keeper 61 is arranged to project outwardly from a first side edge 24 of seat back 20 in a first direction to extend through first-retainer pass-through slot 71 as suggested in FIGS. 5-7. Second keeper 62 is arranged to project outwardly from a second side edge 25 of seat back 20 in a second direction opposite to the first direction to extend through second-retainer pass-through slot 72. First back retainer 63 has an oblong shape and is configured to lie in a vertical orientation relative to seat bottom 30 during an initial stage of mounting backrest 12 on seat base 14 upon movement of first keeper 61 to the unmated position as shown in FIG. 5 and to lie in a horizontal orientation relative to seat bottom 30 during a second backrest-mounting stage mounting backrest 12 on seat base 14 upon movement of first keeper 61 to the mated position as shown in FIG. 6.

First retainer support rod 64 is configured to interconnect first side edge 24 of seat back 20 and first back retainer 63 and extend through first-retainer pass-through slot 71. Second retainer support rod 66 is configured to interconnect second side edge 25 of seat back 20 and second back retainer 65 and extend through second-retainer pass-through slot 72. First and second retainer support rods 64, 66 are arranged to rotate about an axis 53 extending through first- and second-retainer pass-through slots 71, 72 as first back retainer 63 moves between the vertical and horizontal orientations without restricting up-and-down movement of first and second retainer support rods 64, 66 in first- and second-retainer pass-through slots 71, 72 during movement of first keeper 61 and second keeper 62 between the unmated and mated positions.

First retainer support rod 64 has a cylindrical shape and a curved exterior surface that is conformed to mate with lower semicircular segment 74 upon movement of first retainer support rod 64 to a lowest position in first-retainer pass-through slot 71 located a first distance above seat bottom 30 as shown in FIG. 7 and to mate with upper semicircular segment 76 upon movement of first retainer support rod 64 to a highest position in first-retainer pass-through slot 71 located a greater second distance above seat bottom 30 as shown in FIG. 5. Second retainer support rod 66 has a similar shape and function in association with second-retainer pass-through slot 72.

Illustrative configurations of first, second, and third posts 21, 22, 23 included in backrest 12 are shown in FIG. 5. In the illustrated embodiment, first post 21 is a "center" post and is arranged to lie midway between second and third posts 22, 23 and to extend into "center" socket 31. Second post 22 is a "first side" post that, when inserted into companion first side socket 32, is arranged to lie adjacent to first armrest mount 41 as suggested in FIGS. 6 and 7. Third post 23 is a "second side" post that, when inserted into companion second side socket 33, is arranged to lie adjacent to second armrest mount 42 as suggested in FIGS. 6 and 7.

Figure 8:
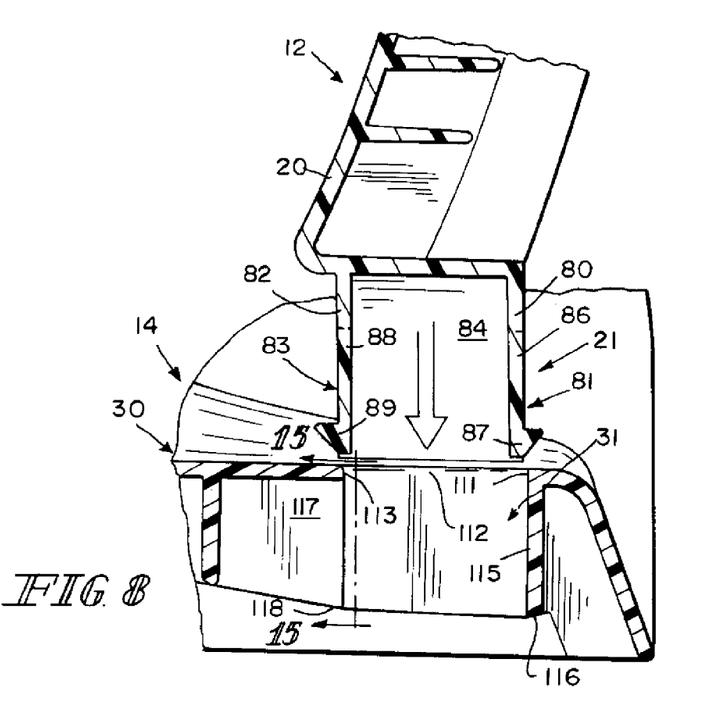
FIG. 8 is an enlarged sectional view taken along line 8-8 of FIG. 6 showing movement of a center post included in the backrest toward a center post-receiver socket formed in the seat base.

First post 21 includes a rear wall 80 carrying a rear anchor 81, a front wall 82 carrying a front anchor 83, an inclined first side wall 84 interconnecting first ends of rear and front walls 80, 82, and an inclined second side wall 85 interconnecting second ends of rear and front walls 80, 82 as shown in FIG. 5. In the illustrated embodiment, walls 80, 82, 84, and 85 are arranged to provide first post 21 with a substantially "trapezoidal" shape with front wall 82 being wider than rear wall 80. As shown, for example, in FIG. 8, rear anchor 81 includes a downwardly extending, deflectable rear anchor arm 86 cantilevered to rear wall 80 and a rearwardly projecting rear anchor flange 87 coupled to a free end of rear anchor arm 86. Similarly, front anchor 83 includes a downwardly extending, deflectable front anchor arm 88 cantilevered to front wall 84 and a forwardly projecting front anchor flange 89 coupled to a free end of front anchor arm 88.

Figure 9:
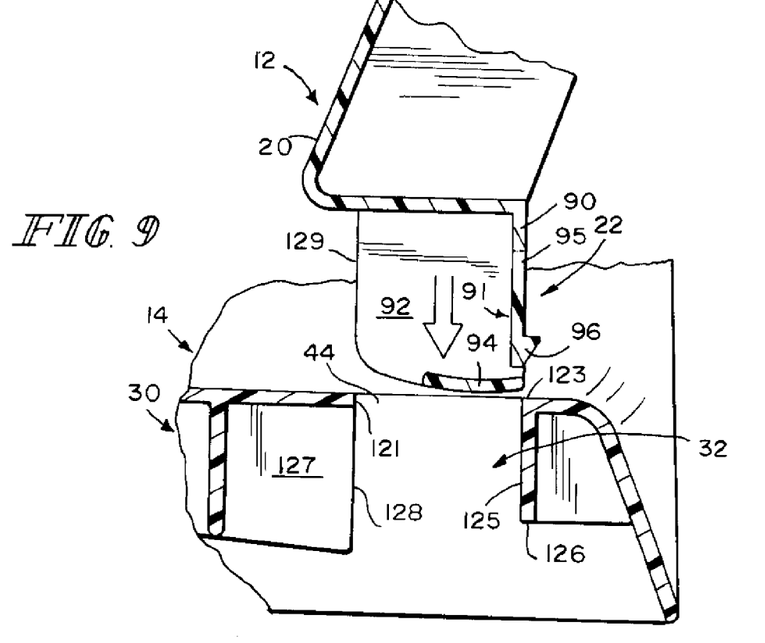
FIG. 9 is an enlarged sectional view taken along line 9-9 of FIG. 6 showing movement of one of the side posts included in the backrest toward a companion side post-receiver socket formed in the seat base.
Figure 10:
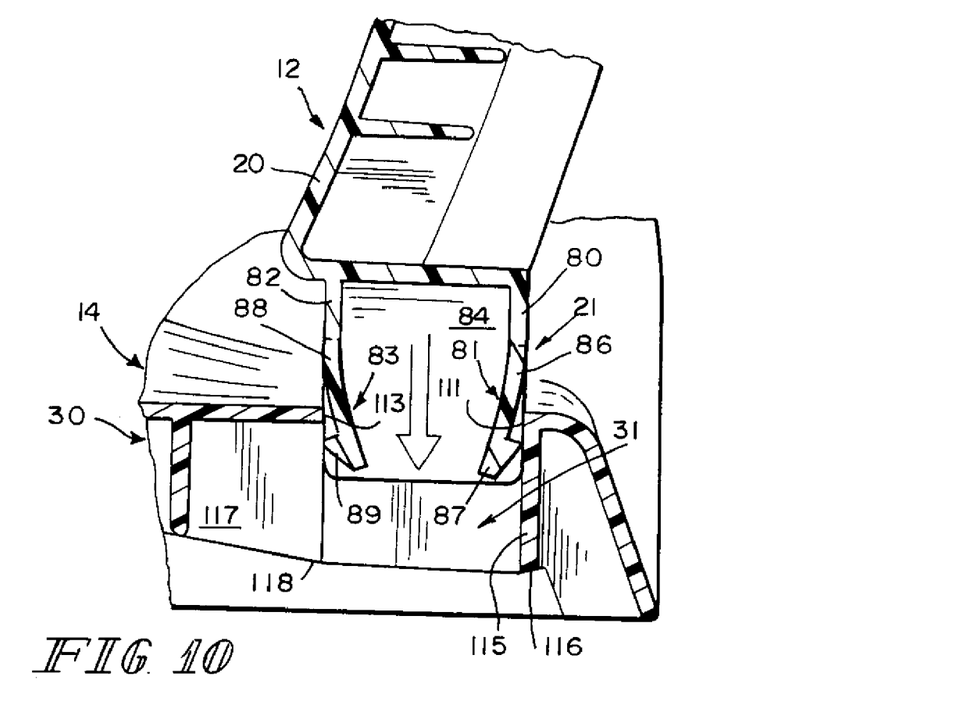
FIG. 10 is a sectional view similar to FIG. 8 showing movement of a lower portion of the center post into a post-receiving channel formed in the center post-receiver socket.
Figure 11:
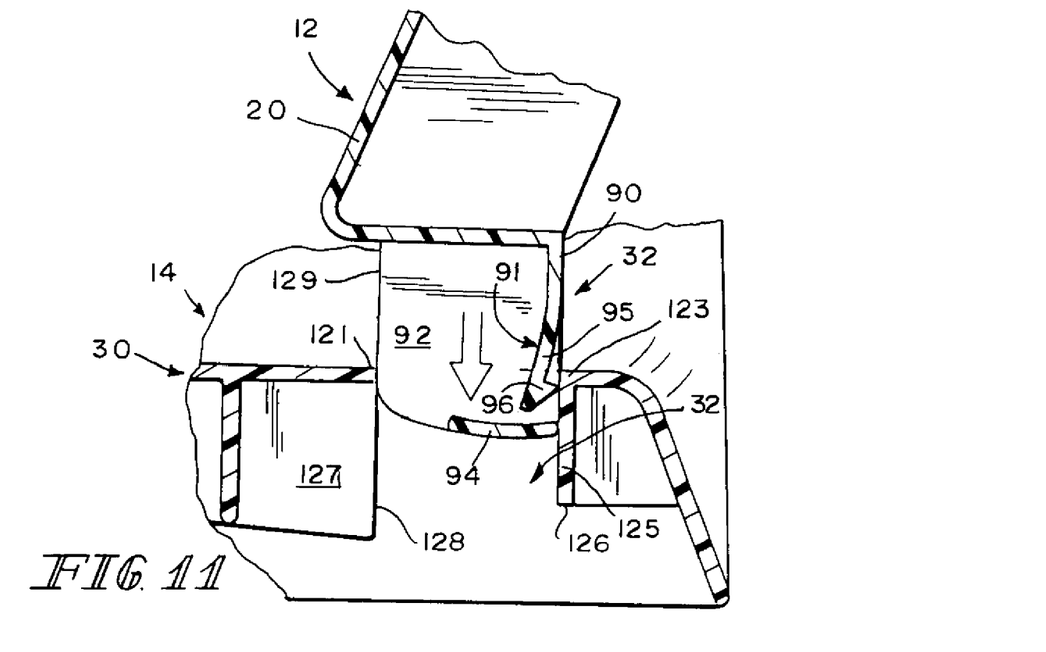
FIG. 11 is a sectional view of a lower portion of the side post shown in FIG. 9 into a post-receiving channel formed in the companion side post-receiver socket.
Figure 12:
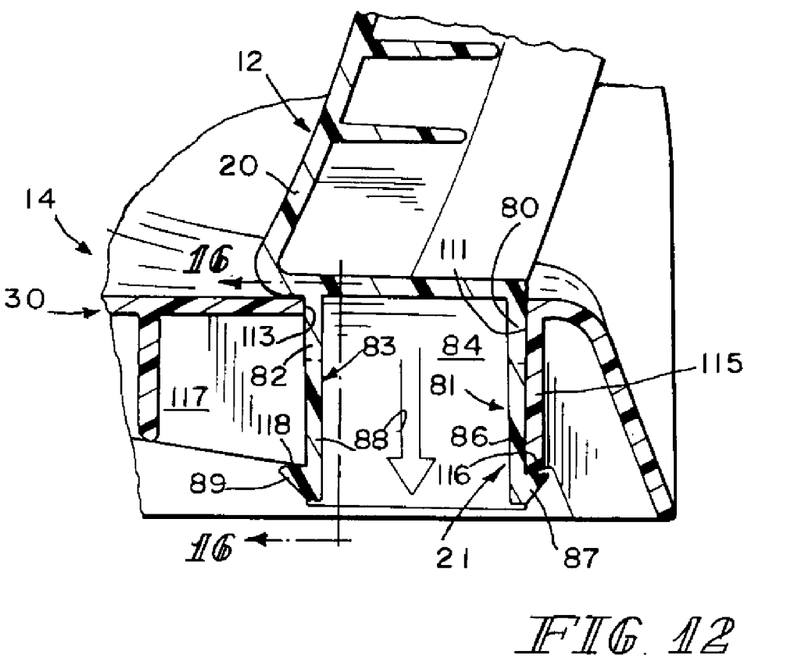
FIG. 12 is an enlarged sectional view taken along line 12-12 of FIG. 7 showing movement of the center post to assume an anchored position in the center post-receiver socket.

Second post 22 includes a rear wall 90 carrying a rear anchor 91, a first side wall 92, a second side wall 93, and a bottom wall 94 extending between and interconnecting lower portions of first and second side walls 92, 93 as shown, for example, in FIGS. 5 and 9. Rear anchor 91 includes a downwardly extending, deflectable rear anchor arm 95 cantilevered to rear wall 90 and a rearwardly projecting rear anchor flange 96 coupled to a free end of rear anchor arm 95.

Third post 23 includes a rear wall 100 carrying a rear anchor 101, a first side wall 102, a second side wall 103, and a bottom wall 104 extending between and interconnecting lower portions of first and second side walls 102, 103 as shown, for example, in FIG. 5. Rear anchor 101 includes a downwardly extending, deflectable rear anchor arm 105 cantilevered to rear wall 100 and a rearwardly projecting rear anchor flange 106 coupled to a free end of rear anchor arm 105.

First (center) socket 31 is configured to receive and anchor first (center) post 21 therein as suggested in FIGS. 5, 8, 10, 12, and 14-16. First socket 31 is defined, in part, by an interior edge formed in seat base 14 comprising, in series, rear segment 111, first side segment 112, front segment 113, and second side segment 114 as shown best in FIG. 5. These segments 111, 112, 113, and 114 are arranged to provide a substantially trapezoid-shaped top opening into first socket 31 to receive the "matching" trapezoid-shaped first post 21 therein. As shown best in FIG. 8, seat base 14 further includes a rear socket wall 115 that extends downwardly from rear segment 111 and terminates at a downwardly facing surface providing a bottom edge defining a retainer flange 116 that is configured to mate with an upwardly facing surface on rearwardly projecting rear anchor flange 87 of rear anchor 81 to help anchor backrest 12 to seat base 14 upon full insertion of first post 21 into first socket 31 as suggested in FIGS. 8, 10, and 12. As shown best in FIGS. 8 and 14-16, seat base 14 further includes a series of vertically and rearwardly extending, horizontally spaced-apart socket fins 117. Socket fins 117 extend toward but lie in spaced-apart relation to rear socket wall 115 to define a post-receiving space or channel therebetween. Each socket fin 117 terminates at a downwardly facing surface 118 that is configured to mate with an upwardly facing surface on forwardly projecting front anchor flange 89 of front anchor 83 to help anchor backrest 12 to seat base upon full insertion of first post 21 into first socket 31 as suggested in FIGS. 8, 10, 12, and 14-16.

Figure 13:
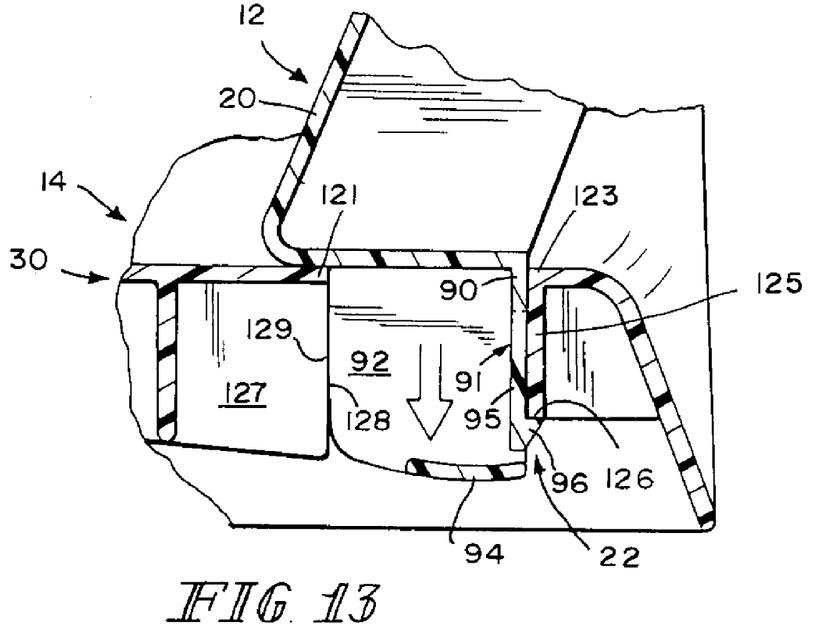
FIG. 13 is an enlarged sectional view taken along line 13-13 of FIG. 7 showing movement of the side post of FIGS. 7 and 9 to assume an anchored position in the companion side post-receiver socket.
Figure 14:
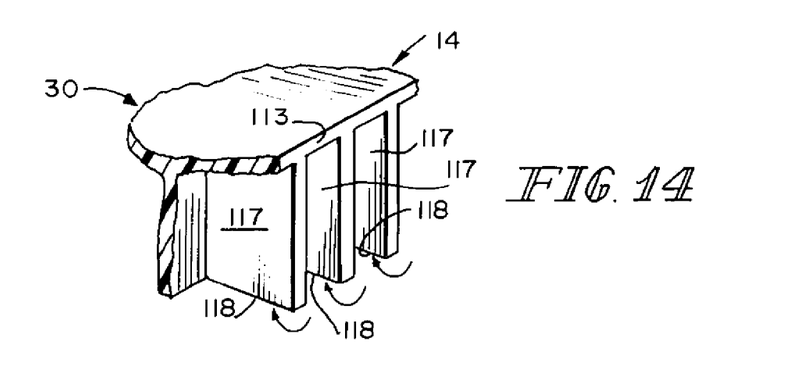
FIG. 14 is an enlarged perspective view of a portion of the seat base showing a series of socket fins arranged to lie in spaced-apart relation to one another along a "front" side of the center post-receiver socket.
Figure 15:
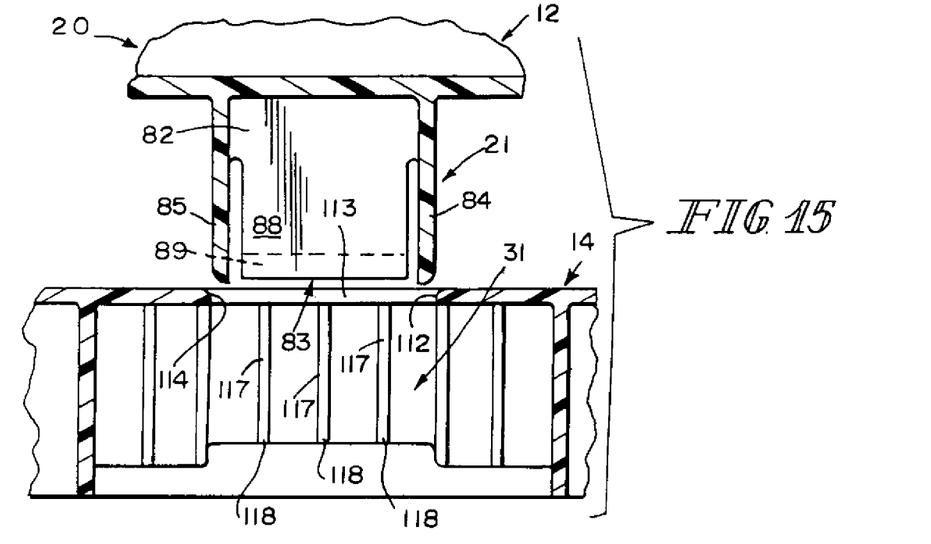
FIG. 15 is a sectional view taken along line 15-15 of FIG. 8.
Figure 16:
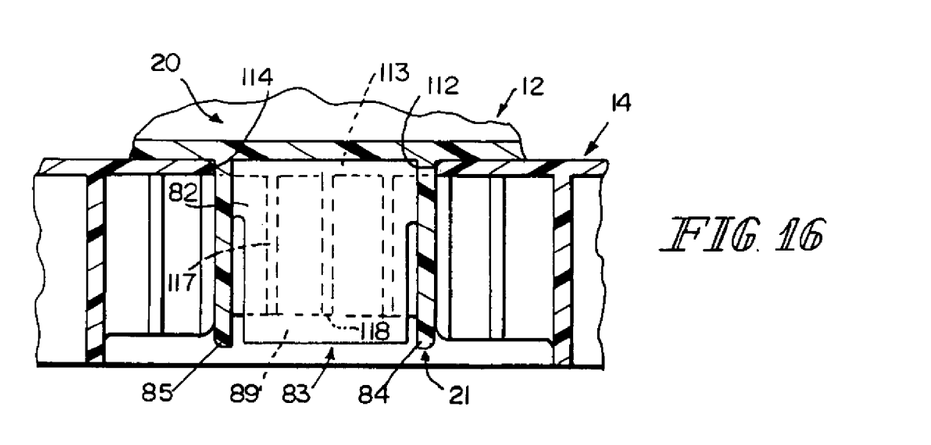
FIG. 16 is a sectional view taken along line 16-16 of FIG. 12.

Second (first side) socket 32 is configured to receive and anchor second (first side) post 22 therein as suggested in FIGS. 5, 9, 11, and 13. Second socket 32 is define, in part, by an interior edge formed in seat base 14 comprising, in series, front segment 121, side segment 122, and rear segment 123 as shown best in FIG. 5. These segments 121, 122, and 123 cooperate with first surface 44 of first armrest support 41 to provide a top opening into second socket 32 to receive the "matching" second post 22 therein. As shown best in FIG. 9, seat base 14 further includes a rear socket wall 125 that extends downwardly from rear segment 123 and terminates at a downwardly facing surface providing a bottom edge defining a retainer flange 126 that is configured to mate with an upwardly facing surface on rearwardly projecting rear anchor flange 96 of rear anchor 91 to help anchor backrest 12 to seat base 14 upon full insertion of second post 22 into second socket 32 as suggested in FIGS. 9, 11, and 13. As shown best in FIGS. 5 and 9, seat base 14 further includes a series of vertically and rearwardly extending, horizontally spaced-apart socket fins 127. Socket fins 127 extend toward but lie in spaced-apart relation to rear socket wall 125 to define a post-receiving space or channel therebetween. Each socket fin 127 terminates at a rearwardly facing surface 128 that faces toward rear socket wall 125 and engages confronting forwardly facing edges 129 of second post 22 as suggested, for example, in FIGS. 5 and 9 once second post 22 is inserted fully into second socket 32 as shown in FIG. 13.

Third (second side) socket 33 is configured to receive and anchor third (second side) post 23 therein as suggested in FIGS. 5-7. Third socket 33 is configured in the same manner as second socket 32 and third post 23 is configured in the same manner as second post 22. Third post 23 is anchored in third socket 33 in the same manner that second post 22 is anchored in second socket 32.

The invention claimed is:

1. A juvenile vehicle seat comprising a seat base including a seat bottom, a first backrest support arranged to extend upwardly away from the seat bottom and formed to include a first-retainer pass-through slot, and a second backrest support arranged to lie in spaced-apart relation to the first backrest support to extend upwardly from the seat bottom and formed to include a second-retainer pass-through slot, and a backrest including a seat back positionable between the slots, a first keeper coupled to the seat back and configured to extend through the first-retainer pass-through slot formed in the first backrest support, and a second keeper coupled to the seat back and configured to extend through the second-retainer pass-through slot, the first keeper including a first back retainer associated with the first-retainer pass-through slot, the second keeper including a second back retainer associated with the second-retainer pass-through slot, the first and second back retainers being positioned for linear and pivotal movement relative to the seat base between a mated position mating with a portion of the seat base to block removal of the first keeper from the first-retainer pass-through slot and to block removal of the second keeper from the second-retainer pass-through slot so as to block separation of the backrest from the seat base and an unmated position unmating from the portion of the seat base to allow removal of the first keeper from the first-retainer pass-through slot and removal of the second keeper from the second-retainer pass-through slot so as to permit separation of the backrest from the seat base.

2. The seat of claim 1, wherein the first backrest support includes an upright side wall formed to include the first-retainer pass-through slot, and the upright side wall includes a first surface arranged to face toward the second backrest support and an opposite second surface arranged to face away from the second backrest support and configured to define the portion of the seat base mated with the first back retainer upon movement of the first keeper to the mated position.

3. The seat of claim 2, further comprising a first armrest coupled to the first backrest support to form a chamber therebetween containing the first back retainer.

4. The seat of claim 3, wherein the first armrest includes an arm support and an arm cantilevered to the arm support and the arm support is coupled to the first backrest support to define the chamber therebetween.

5. The seat of claim 3, wherein the first armrest includes an arm support arranged to lie in spaced-apart relation to the second backrest support to locate the first backrest support therebetween and an arm cantilevered to the arm support and the arm support is coupled to the first backrest support to define the chamber therebetween.

6. The seat of claim 3, wherein the first armrest includes an arm support mounted on the first backrest support for rotation about an axis extending through the first backrest support, an arm cantilevered to the arm support to rotate therewith about the axis, and an axle coupled to the upright side wall of the first backrest support and to the arm support and arranged to extend along the axis.

7. The seat of claim 2, wherein the upright side wall includes an interior edge defining the first-retainer pass-through slot and having, in series, a first straight segment, a lower semicircular segment coupled to the first straight segment, a second straight segment coupled to the lower semicircular segment and arranged to lie in spaced-apart relation to the first straight segment to define therebetween a width of the first-retainer pass-through slot, and an upper semicircular segment arranged to interconnect the second and first straight segments.

8. The seat of claim 7, wherein the first back retainer has an oblong shape, a length that is greater than the width of the first-retainer pass-through slot to block free movement of the first back retainer through the first-retainer pass-through slot upon movement of the seat back relative to the seat base to locate the first keeper in the mated position, and a width that is less than the width of the first-retainer pass-through slot to allow free movement of the first back retainer through the first-retainer pass-through slot upon movement of the seat back relative to the seat base to locate the first keeper in the unmated position.

9. The seat of claim 8, wherein the first keeper further includes a retainer support rod configured to interconnect the seat back and the first back retainer and arranged to extend through and lie in the first-retainer pass-through slot upon movement of the first keeper to the mated position.

10. The seat of claim 9, wherein the retainer support rod has a cylindrical shape and a curved exterior surface that is conformed to mate with the lower semicircular segment upon movement of the retainer support rod to a lowest position in the first-retainer pass-through slot located a first distance above the seat bottom and to mate with the upper semicircular segment upon movement of the retainer support rod to a highest position in the first-retainer pass-through slot located a greater second distance above the seat bottom.

11. The seat of claim 1, wherein the first keeper is arranged to project outwardly from a first side edge of the seat back in a first direction to extend through the first-retainer pass-through slot and the second keeper is arranged to project outwardly from a second side edge of the seat back in a second direction opposite to the first direction to extend through the second-retainer pass-through slot.

12. The seat of claim 11, wherein the first back retainer has an oblong shape and is configured to lie in a vertical orientation relative to the seat bottom during an initial stage of mounting the backrest on the seat base upon movement of the first keeper to the unmated position and to lie in a horizontal orientation relative to the seat bottom during a second backrest-mounting stage mounting the backrest on the seat base upon movement of the first keeper to the mated position.

13. The seat of claim 12, wherein the first keeper further includes a first retainer support rod configured to interconnect the first side edge of the seat back and the first back retainer and extend through the first-retainer pass-through slot, the second keeper further includes a second retainer support rod configured to interconnect the second side edge of the seat back and the second back retainer and extend through the second-retainer pass-through slot, and the first and second retainer support rods are arranged to rotate about an axis extending through the first- and second-retainer pass-through slots as the first back retainer moves between the vertical and horizontal orientations without restricting up-and-down movement of the first and second retainer support rods in the first- and second-retainer pass-through slots during movement of the first keeper between the unmated and mated positions.

14. The seat of claim 12, wherein the first backrest support includes an interior edge defining the first-retainer pass-through slot and having a first straight segment and a second straight segment arranged to lie in spaced-apart relation to the first straight segment to define therebetween a width of the first-retainer pass-through slot and wherein the first back retainer has a length that is greater than the width of the first-retainer pass-through slot to block free movement of the first back retainer through the first-retainer pass-through slot upon movement of the seat back relative to the seat base to locate the first keeper in the mated position, and a width that is less than the width of the first-retainer pass-through slot to allow free movement of the first back retainer through the first-retainer pass-through slot upon movement of the seat back relative to the seat base to locate the first keeper in the unmated position.

15. The seat of claim 11, further comprising a first armrest coupled to the first backrest support to form a chamber therebetween containing the first back retainer.

16. The seat of claim 15, wherein the first armrest includes an arm support and an arm cantilevered to the arm support and the arm support is coupled to the first backrest support to define the chamber therebetween.

17. The seat of claim 1, wherein the seat base is further formed to include a first socket located in a fixed position relative to the seat bottom, and the first socket is formed to include a post-receiving channel and a socket wall bordering the post-receiving channel and providing a bottom edge defining a retainer flange, the backrest further includes a first post coupled to the seat back and arranged to extend into the post-receiving channel formed in the first socket to orient the seat back in an upright fixed seat-forming position relative to the seat bottom, and further comprising a first anchor configured to anchor the first post in the post-receiving channel formed in the first socket to retain the seat back in the upright fixed seat-forming position.

18. The seat of claim 17, wherein the first socket is located midway between the first and second backrest supports, the seat base is further formed to include a second socket located in a fixed position relative to the seat bottom adjacent to the first backrest support and between the first socket and the first backrest support and a third socket located in a fixed position relative to the seat bottom adjacent to the second backrest support, the backrest further includes a second post coupled to the seat back and arranged to extend into a post-receiving channel formed in the second socket and a third post coupled to the seat back to locate the first post between the second and third posts and arranged to extend into a post-receiving channel formed in the third socket, and further comprising a second anchor configured to anchor the second post in the post-receiving channel in the second socket and a third anchor configured to anchor the third post in the post-receiving channel in the third socket.

19. The seat of claim 18, wherein the first backrest support includes an upright side wall formed to include the first-retainer pass-through slot and arranged to define a boundary of the post-receiving channel formed in the second socket.

20. The seat of claim 19, wherein the upright side wall includes a first surface arranged to face toward the second backrest support and define the boundary of the post-receiving channel formed in the second socket and the upright side wall further includes an opposite second surface arranged to face away from the second backrest support and configured to define the portion of the seat base mounted with the first back retainer upon movement of the first keeper to the mated position.

21. The seat of claim 17, wherein the first anchor includes a retainer coupled to the first post and arranged to mate with the retainer flange in a position under the socket wall bordering the post-receiving channel to block removal of the first post from the post-receiving channel formed in the first socket without blocking insertion of the first post into the post-receiving channel.

22. The seat of claim 21, wherein the seat back further includes a downwardly facing wall extending outwardly from the first post and the seat base further includes an upwardly facing surface arranged to mate with the downwardly facing wall extending outwardly from the first post upon movement of the first post in the post-receiving channel formed in the first socket to cause the retainer coupled to the first post to mate with the retainer flange included in the first socket.

23. The seat of claim 22, wherein the seat back includes a front surface facing toward a front edge of the seat bottom and the downwardly facing wall included in the seat back extends between the first post and the front surface of the seat back.

24. The seat of claim 21, wherein the first socket includes a top wall having a top perimeter edge defining a top aperture opening into the post-receiving channel and receiving the first post therein during insertion of the first post into the post-receiving channel, the bottom edge defines a bottom aperture opening into the post-receiving channel and is arranged to lie in spaced-apart relation to the top perimeter edge, and the seat back further includes a downwardly facing wall arranged to mate with the top wall of the first socket upon movement of the first post in the post-receiving channel formed in the first socket to cause the retainer coupled to the first post to mate with the retainer flange included in the first socket.

25. The seat of claim 1, wherein the first backrest support includes an interior edge defining the first-retainer pass-through slot and having, in series, a first straight segment, a lower end segment coupled to the first straight segment, a second straight segment coupled to the lower end segment and arranged to lie in spaced-apart relation to the first segment to define therebetween a width of the first-retainer pass-through slot, and an upper end segment arranged to interconnect the second and first straight segments and locate the lower end segment between the seat base and the upper end segment, the seat base is further formed to include a first socket formed to include a post-receiving channel, the backrest further includes a first post coupled to the seat back and arranged to lie substantially outside the post-receiving channel formed in the first socket upon movement of the seat back to a raised position relative to the seat bottom wherein the first keeper is located in a highest position in the first-retainer pass-through slot adjacent to the upper end segment and wherein the first post is arranged to extend into the post-receiving channel formed in the first socket upon movement of the seat back to a lowered position relative to the seat bottom wherein the first keeper is located in a lowest position in the first-retainer pass-through slot adjacent to the lower end segment.

26. The seat of claim 25, further comprising a first anchor configured to anchor the first post in the post-receiving channel formed in the first socket upon movement of the seat back to the lowered position.

27. The seat of claim 26, wherein the first socket is located midway between the first and second backrest supports, the seat base is further formed to include a second socket located adjacent to the first backrest support and between the first socket and the first backrest support and a third socket located adjacent to the second backrest support, the backrest further includes a second post coupled to the seat back and arranged to extend into a post-receiving channel formed in the second socket and a third post coupled to the seat back to locate the first post between the second and third posts and arranged to extend into a post-receiving channel formed in the third socket, and further comprising a second anchor configured to anchor the second post in the post-receiving channel in the second socket upon movement of the seat back to the lowered position and a third anchor configured to anchor the third post in the post-receiving channel in the third socket upon movement of the seat back to the lowered position.

28. A juvenile vehicle seat comprising a backrest including a seat back and a keeper coupled to the seat back and a seat base including first and second backrest supports arranged to lie in spaced-apart relation to one another to locate the seat back therebetween, and wherein the first backrest support includes an interior edge arranged to define an oblong pass-through slot, the keeper includes a retainer support rod coupled to the seat back and arranged to extend through the oblong pass-through slot and a back retainer coupled to the retainer support rod, the back retainer is arranged to mate with a portion of the first backrest support to block removal of the retainer support rod from the oblong pass-through slot upon linear and pivotal movement of the backrest to a vertical mated position relative to the seat base so as to block separation of the backrest from the seat base and to unmate from the portion of the first backrest support to allow removal of the retainer support rod from the oblong pass-through slot upon movement of the backrest to a horizontal unmated position relative to the seat base so as to permit separation of the backrest from the seat base.

29. The seat of claim 28, wherein the first backrest support includes an upright side wall formed to include the oblong pass-through slot, and the upright side wall includes a first surface arranged to face toward the second backrest support and an opposite second surface arranged to face away from the second backrest support and configured to define the portion of the seat base mated with the back retainer upon movement of the backrest to the mated position.

30. The seat of claim 29, further comprising a first armrest coupled to the first backrest support to form a chamber therebetween containing the back retainer.

31. The seat of claim 30, wherein the first armrest includes an arm support arranged to lie in spaced-apart relation to the second backrest support to locate the first backrest support therebetween and an arm cantilevered to the arm support and the aim support is coupled to the first backrest support to define the chamber therebetween.

32. The seat of claim 29, wherein the upright side wall includes an interior edge defining the oblong pass-through slot and having, in series, a first straight segment, a lower semicircular segment coupled to the first straight segment, a second straight segment coupled to the lower semicircular segment and arranged to lie in spaced-apart relation to the first straight segment to define therebetween a width of the oblong pass-through slot, and an upper semicircular segment arranged to interconnect the second and first straight segments.

33. The seat of claim 32, wherein the back retainer has an oblong shape, a length that is greater than the width of the oblong pass-through slot to block free movement of the back retainer through the oblong pass-through slot upon movement of the seat back relative to the seat base to the first position, and a width that is less than the width of the oblong pass-through slot to allow free movement of the back retainer through the oblong pass-through slot upon movement of the seat back relative to the seat base to the unmated position.

34. The seat of claim 32, wherein the retainer support rod has a cylindrical shape and a curved exterior surface that is conformed to mate with the lower semicircular segment upon movement of the retainer support rod to a lowest position in the oblong pass-through slot located a first distance above the seat bottom and to mate with the upper semicircular segment upon movement of the retainer support rod to a highest position in the oblong pass-through slot located a greater distance above the seat bottom.

35. The seat of claim 28, wherein the keeper is arranged to project outwardly from a first side edge of the seat back in a first direction to extend through the oblong pass-through slot.

36. The seat of claim 35, wherein the back retainer has an oblong shape and is configured to lie in a vertical orientation relative to the seat bottom during an initial stage of mounting the backrest on the seat base upon movement of the backrest to the second position and to lie in a horizontal orientation relative to the seat bottom during a second backrest-mounting stage mounting the backrest on the seat base upon movement of the backrest to the mated position.

37. The seat of claim 36, wherein a retainer support rod is configured to interconnect the first side edge of the seat back and the back retainer, and the first retainer support rod is arranged to rotate about an axis extending through the oblong pass-through slot as the back retainer moves between the vertical and horizontal orientations without restricting up-and-down movement of the first retainer support rod in the oblong pass-through slot during movement of the backrest between the mated and unmated positions.

38. The seat of claim 28, wherein the seat base is further formed to include a first socket located in a fixed position relative to the seat bottom, and the first socket is formed to include a post-receiving channel and a socket wall bordering the post-receiving channel and providing a bottom edge defining a retainer flange, the backrest further includes a first post coupled to the seat back and arranged to extend into the post-receiving channel formed in the first socket to orient the seat back in an upright fixed seat-forming position relative to the seat bottom, and further comprising a first anchor configured to anchor the first post in the post-receiving channel formed in the first socket to retain the seat back in the upright fixed seat-forming position.

39. The seat of claim 38, wherein the first anchor includes a retainer coupled to the first post and arranged to mate with the retainer flange in a position under the socket wall bordering the post-receiving channel to block removal of the first post from the post-receiving channel formed in the first socket without blocking insertion of the first post into the post-receiving channel.

40. The seat of claim 38, wherein the first socket is located midway between the first and second backrest supports, the seat base is further formed to include a second socket located in a fixed position relative to the seat bottom adjacent to the first backrest support and between the first socket and the first backrest support and a third socket located in a fixed position relative to the seat bottom adjacent to the second backrest support, the backrest further includes a second post coupled to the seat back and arranged to extend into a post-receiving channel formed in the second socket and a third post coupled to the seat back to locate the first post between the second and third posts and arranged to extend into a post-receiving channel formed in the third socket, and further comprising a second anchor configured to anchor the second post in the post-receiving channel in the second socket and a third anchor configured to anchor the third post in the post-receiving channel in the third socket.

* * * * *